(12) United States Patent
Brass et al.

(10) Patent No.: US 7,478,649 B2
(45) Date of Patent: Jan. 20, 2009

(54) ABSORBENT PLUGS AND CAPS FOR AIR CONDITIONING AND REFRIGERATION FITTINGS

(75) Inventors: Jack Brass, North York (CA); Steven M. Knowles, North Manchester, IN (US)

(73) Assignee: Brasscorp Limited, North York, ON (CA)

( * ) Notice: Subject to any disclaimer, the term of this patent is extended or adjusted under 35 U.S.C. 154(b) by 171 days.

(21) Appl. No.: 11/115,343

(22) Filed: Apr. 27, 2005

(65) Prior Publication Data

US 2006/0001264 A1 Jan. 5, 2006

Related U.S. Application Data

(60) Provisional application No. 60/521,764, filed on Jun. 30, 2004.

(51) Int. Cl.
*F16L 55/10* (2006.01)
(52) U.S. Cl. .............................. 138/89; 285/901; 62/475
(58) Field of Classification Search .................. 285/901; 62/474, 475; 206/204; 312/31.1; 138/89
See application file for complete search history.

(56) References Cited

U.S. PATENT DOCUMENTS

| | | | | |
|---|---|---|---|---|
| 3,254,784 | A * | 6/1966 | Lancesseur ................ 312/31.1 |
| 3,882,315 | A * | 5/1975 | Soldan ........................ 206/204 |
| 3,918,578 | A * | 11/1975 | Cullen et al. ................. 206/204 |
| 4,389,446 | A * | 6/1983 | Blom et al. .................. 424/413 |
| 4,834,234 | A * | 5/1989 | Sacherer et al. ............. 206/204 |
| 4,936,700 | A * | 6/1990 | Morris ........................ 401/196 |
| 5,029,699 | A * | 7/1991 | Insley et al. ................. 206/204 |
| 5,160,021 | A * | 11/1992 | Sibley et al. ................ 206/204 |
| 5,666,791 | A * | 9/1997 | Burk ............................ 62/474 |
| 5,678,684 | A * | 10/1997 | Wright ........................ 206/204 |
| 6,349,562 | B1 * | 2/2002 | Kaspar et al. .................. 62/475 |
| 6,422,033 | B2 * | 7/2002 | Ishikawa et al. ............... 62/475 |
| 6,446,463 | B2 * | 9/2002 | Bernini ......................... 62/473 |
| 6,446,464 | B1 * | 9/2002 | Bernini ......................... 62/509 |
| 6,474,098 | B2 * | 11/2002 | Perrine et al. .................. 62/475 |

* cited by examiner

*Primary Examiner*—David E Bochna
(74) *Attorney, Agent, or Firm*—Dowell & Dowell, PC

(57) ABSTRACT

Absorbent plugs and caps plug or cap fittings that have been used to inject liquids into various systems. The plugs are sized to fit within the interior body cavity of fittings to absorb the residual liquid that is left in the cavity after use. The caps are sized to fit over the exterior of the fittings to absorb any residual liquid that leaks out from fitting exterior surfaces. The caps can also have interior plug extensions that extend into the interior cavities to also absorb the residual liquid from the interior. The plugs have non absorptive tabs for insertion and removal and the caps have non absorptive exterior skins or coverings to contain the absorbed liquid within the cap. One such use is to plug and/or cap fittings such as R134a service couplers which are used to inject dye into automotive air conditioning systems.

25 Claims, 6 Drawing Sheets

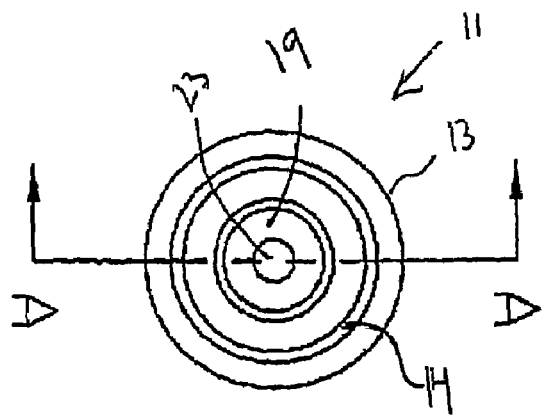
FIG. 10
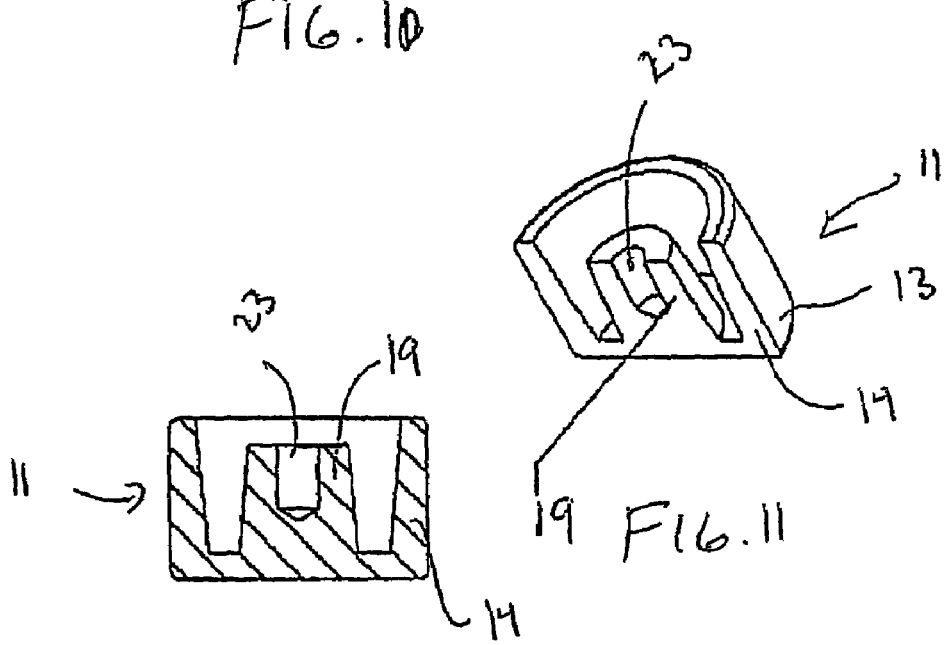
FIG. 12
FIG. 11
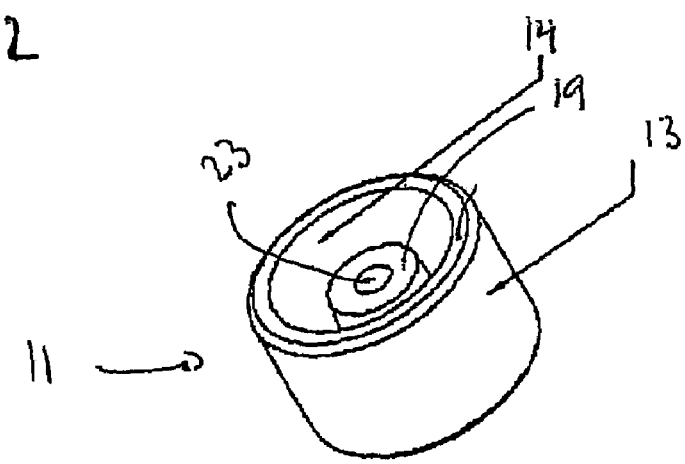
FIG. 9

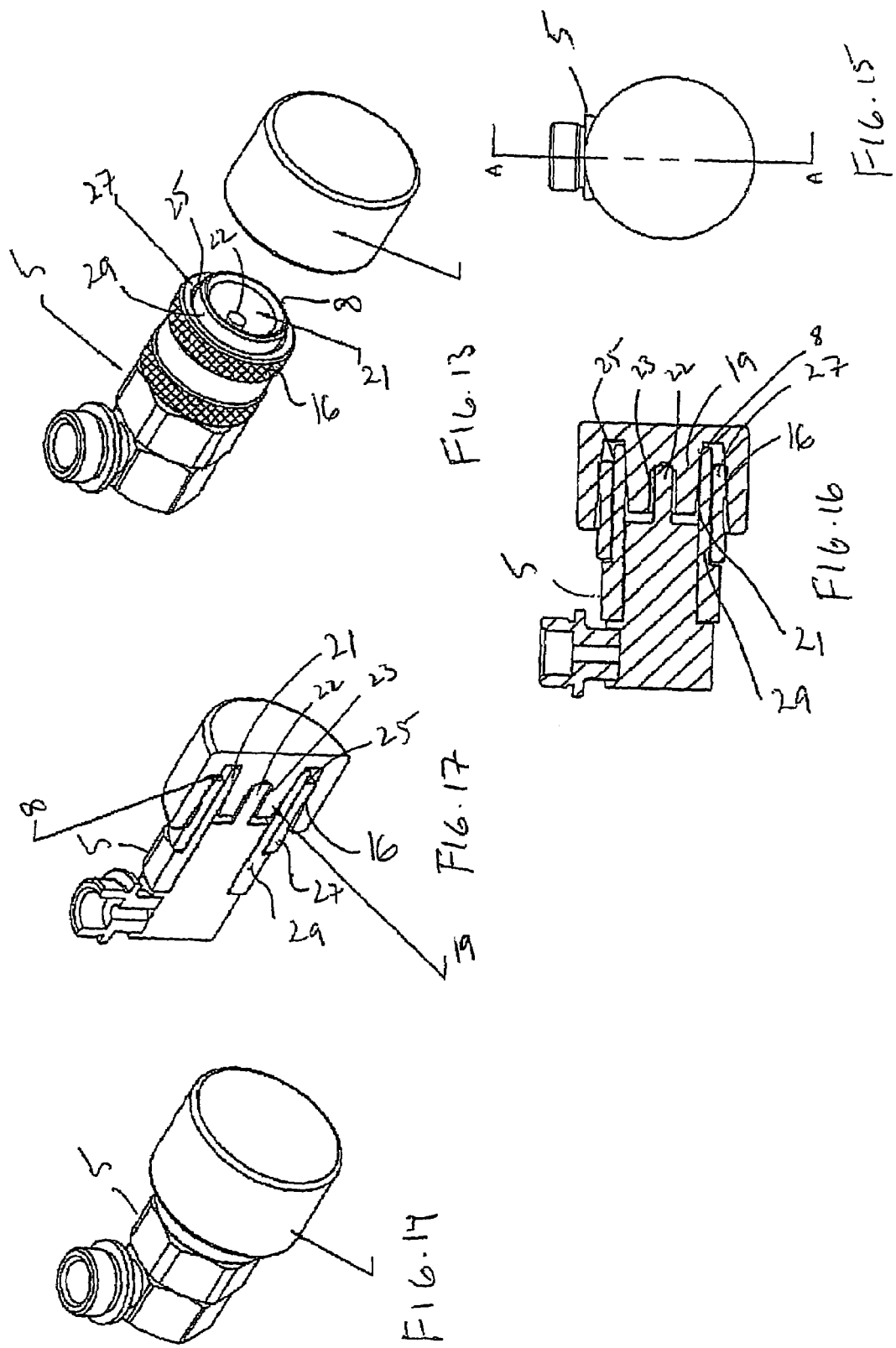

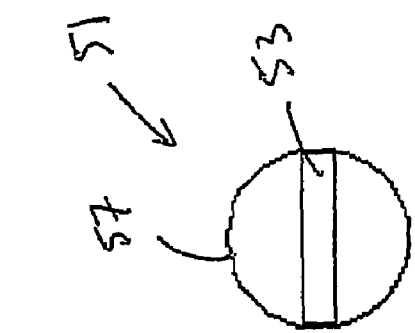
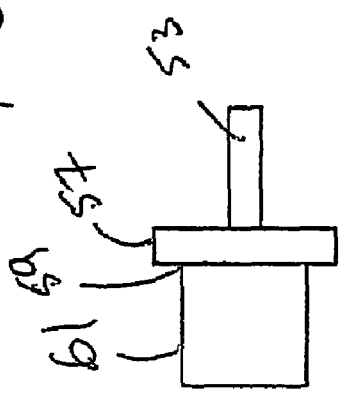
FIG.19
FIG.21
FIG.20
FIG.18

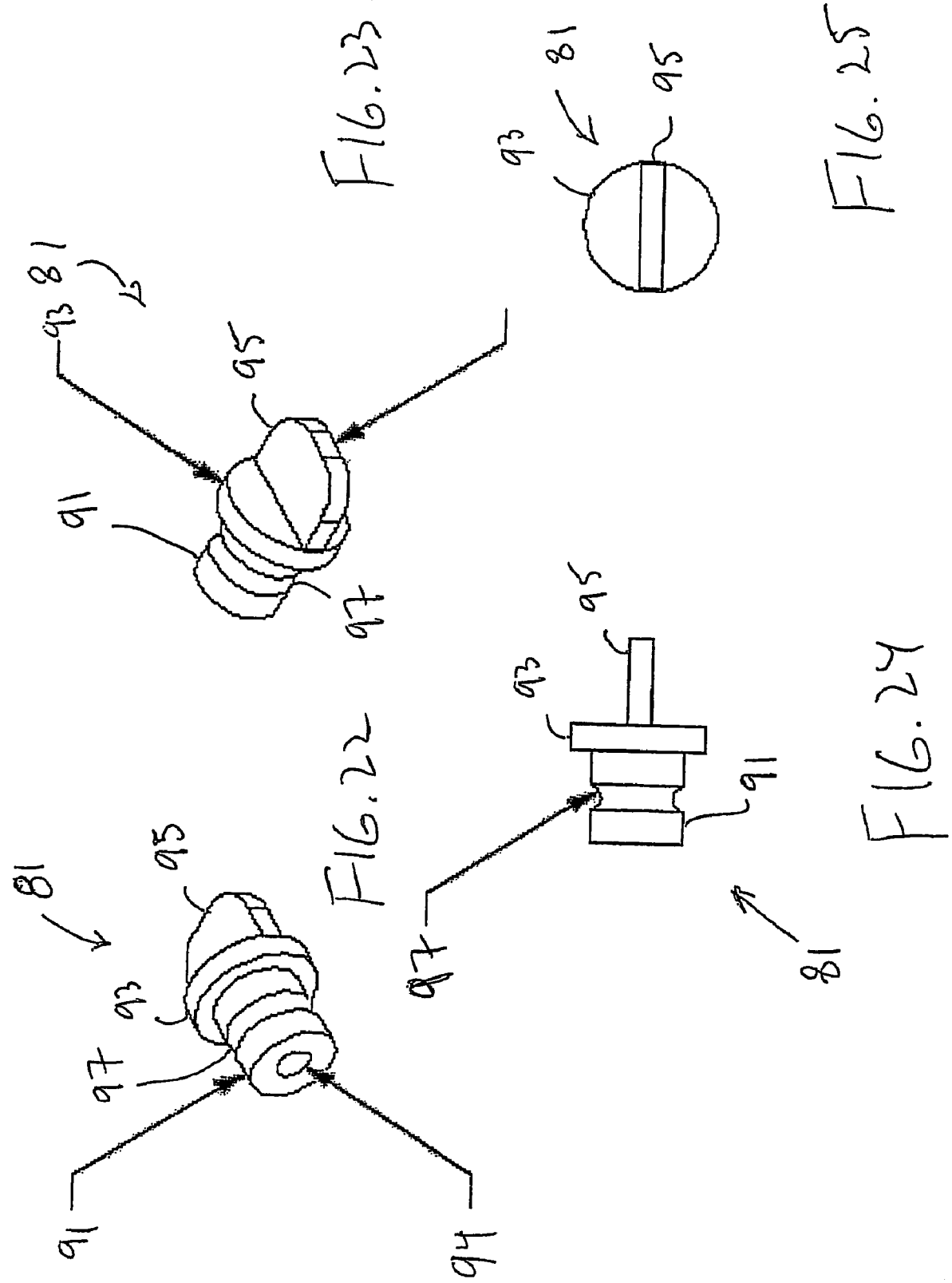

ABSORBENT PLUGS AND CAPS FOR AIR CONDITIONING AND REFRIGERATION FITTINGS

CROSS-REFERENCE TO RELATED APPLICATIONS

This application claims priority from, and the benefit of, the filing date of U.S. Provisional Patent Application 60/521,764 filed 30 Jun. 2004 under title Absorbent Fitting Plugs and Caps. The contents of the above application is hereby incorporated by reference into the Detailed Description hereof.

FIELD OF THE INVENTION

The invention relates to air conditioning and refrigeration system fittings and to fittings used in association with equipment for air conditioning and refrigeration system.

BACKGROUND OF THE INVENTION

A well know method for detecting leaks in air conditioning and refrigeration systems is to inject a fluorescent dye into the system. Wherever there is a leak, the dye will leak out with the refrigerant and oil and can be detected by shining a light of an appropriate wavelength, typically ultraviolet or near ultraviolet, on the area.

This method has been used at least since the Montreal Protocol of 1987 was adopted. Its use increased substantially after R134A refrigerant became widely used in 1993. R134A molecules are smaller than those of previous refrigerants. Systems used R134A refrigerant also operate under higher pressures. This combination resulted in a greater number of leaks of smaller size. It was, and continues to be, a significant problem.

Since about 1995 fluorescent leak detection has been acknowledged as the best method of detecting such leaks. Previously, systems that leaked were generally "topped up" with additional refrigerant. In most jurisdictions this is now illegal. Even though there are millions of injectors in circulation, the actual use of fluorescent leak detection has been held back, at least in part, because it is very messy.

Alternative leak detection methods include, for example, soap and water, non-fluorescent dye and electronic sniffers. Soap and water is largely ineffective as it is hard to control its application to defined areas and it does not detect very small leaks that might involve, perhaps an ounce of refrigerant per year. This is significant when some new cars only have 1 lb. of refrigerant in a properly operating system. The use of non-fluorescent dye generally suffers from the same difficulties as fluorescent dye, and non-fluorescent dyes are generally not as effective visual indicators of leaks. Sniffers are very useful in leak detection. In fact, they are often used as a complementary method to fluorescent leak defection. Sniffers are very good at finding leaks leading to the evaporator. This can be done with dye, but is not usually as effective. Sniffers do need to be close to the leak to obtain a sniff. This can be difficult when the area is inaccessible. For most leaks it will be more effective to inject dye, leave and return later to detect any leaks.

There are many forms of dye injectors currently in use including the Cliplight™ Revolver™ sold by Cliplight Manufacturing Company of Toronto Canada and described in co-pending International patent application no. PCT/CA2004/000114 filed 29 Jan. 2004 under title Manual Liquid Metering Device and Cartridge claiming the benefit of U.S. Provisional Patent Application Ser. No. 60/443,532 filed 30 Jan. 2003.

All of the injectors currently in use suffer from one common problem. They are all very messy to store. During use, the injector is connected to a fitting on the system and dye is pumped into the system thru the fitting. When the injector is disconnected from the system there is dye remaining in the fitting on the injector. This dye will drip out of the fitting during storage and contaminate anything near it. Due to its nature, this dye permeates most materials and will permanently stain. When the dye leaks out it gets on the exterior of the fitting and the dye injector making the device very messy from that point on. Also, upon connection to the next system port the dye remaining in the dye injector fitting will contaminate the exterior of the port, leaving a mess on that port even before use. Also, residual dye build up can be sufficient to create particles that can be introduced into the system with adverse consequences.

Plugs and caps have been tried to contain the dye remaining in the injector fitting. Plugs that go inside the fitting displace some of the dye when installed, but the remaining dye leaks out during storage or pours out when the plug is removed and still contaminates the next system port. Caps, such as vinyl-dipped caps, that go over the outside of the injector fitting attempt to contain the dye in the fitting. Because this dye is so aggressive, it will eventually leak out from under the cap. Any remaining dye under the cap will also pour out when the cap is removed and also contaminate the exterior of the next system port.

Such caps have to be constantly cleaned, typically with a rag, to avoid contamination from one fitting to the next, or between uses on the same fitting. The dye tends to migrate externally on the fitting over time and the rag becomes contaminated. Often the injector is simply hung up after use to allow the dye to drip into a bucket. These problems can be exacerbated in mobile use where the injector cannot be hungup after use.

As leaking refrigerant is harmful to the environment and fluorescent leak detection is generally the most effective manner of leak detection, limitations on the use of fluorescent leak detection are themselves an environmental problem.

All of the various devices designed to contain the dye within the injector fitting do not work very well. At best they reduce the mess or delay the mess until later.

SUMMARY OF THE INVENTION

In a first aspect the invention provides a plug for use in association with a fitting for use with an air conditioning or refrigeration system or with equipment used in association with an air conditioning or refrigeration system which fitting has a generally cylindrical interior cavity open at one end. The plug includes a piece of resilient material that is sized to be inserted into the open end of the interior cavity of the fitting such that the piece is secured in the cavity and the piece comes into contact with liquid in the cavity. The material is absorbent to liquids ordinarily used in association with air conditioning or refrigeration systems. The absorbent material is non-shedding of its own material. The absorbent material is resistant to breakdown when in contact with liquids in ordinary use in an air conditioning or refrigeration system.

In a second aspect the invention also provides a plug for use in association with a fitting for use with an air conditioning or refrigeration system or with equipment used in association with an air conditioning or refrigeration system which fitting has a generally cylindrical interior cavity open at one end and a pin extending into the cavity from an opposing end. The plug includes a piece of resilient material with a clearance hole extending into the piece. The piece of resilient material is sized to be inserted into the open end of the interior cavity of the fitting with the clearance hole over the pin such that the piece is secured in the cavity and the piece comes into contact with liquid in the cavity. The material is absorbent to liquids ordinarily used in association with air conditioning or refrigeration systems. The absorbent material is non-shedding of its own material. The absorbent material is resistant to breakdown when in contact with liquids in ordinary use in an air conditioning or refrigeration system.

The piece may be generally cylindrical with the clearance hole running axially within the piece. The piece may substantially fill the internal diameter of the cavity to limit the possibility of liquid leaking from the cavity before it is absorbed. The piece may substantially fill the cavity.

The piece may have an external diameter slightly larger than the internal diameter of the cavity. The material may be sufficiently compressible to allow the piece to be inserted into the cavity, while sufficiently resilient to return to its original form subject to containment by the cavity.

The fitting may have an internal thread about the inner circumference of the cavity. The piece may be able to be inserted and secured by rotating it on to the threads. The piece may be able to be secured by contact with an internal surface of the cavity.

The fitting may have at least one spring loaded ball projecting into the cavity from the inner circumference of the cavity. The piece may be able to be inserted past the at least one ball under longitudinal pressure. The piece may be formed from a hard material. The piece may have a circumferential thread to match a thread on the interior of the cavity such that the piece may be inserted and secured by engaging the respective threads and rotating the piece.

The fitting may have at least one spring loaded ball projecting into the cavity from the inner circumference of the cavity. The piece may have a circumferential ball groove into the piece. The piece may be sufficiently hard that it can be inserted into the cavity under longitudinal pressure, pushing away the at least one ball during insertion, such that the groove engages the at least one ball to secure the piece.

The piece may be generally frustumconical with the clearance hole running axially within the piece from an end of narrower diameter. The plug may include an extended ridge around an end of the piece opposite the clearance hole to provide additional absorption volume outside the interior cavity of the fitting and to contact a rim of the fitting to absorb liquid from the rim.

The plug may further include a non-absorbent pull tab at an end of the absorbent piece opposite the clearance hole. The extended ridge may lie between the clearance hole and the pull tab.

The plug may include a cap with an interior absorbent material and an exterior skin of non-absorbent material. The interior of the cap may be sized to slip securely onto an exterior of the fitting to absorb liquid that may be located on the fitting outside the interior cavity. The piece may extend from the cap into the interior cavity.

The cap may be for use with a fitting that is a snap-on coupler with coaxial sleeves. The interior of the cap may be sized to slip tightly over an exterior of the sleeves.

In a third aspect the invention provides a cap for use with a fitting for use in an air conditioning or refrigeration system or with equipment used in association with an air conditioning or refrigeration system which fitting has a generally cylindrical interior cavity open at one end, the cap comprising: an interior of absorbent material and an exterior skin of non absorbent material. The interior of the cap is sized to slip securely onto an exterior of the fitting to come into contact with liquid that may be located on the fitting outside the interior cavity. The material is absorbent to liquids ordinarily used in association with air conditioning or refrigeration systems. The absorbent material is non-shedding of its own material. The absorbent material is resistant to breakdown when in contact with liquids in ordinary use in an air conditioning or refrigeration system.

The fitting may be a snap-on coupler with coaxial sleeves. The interior of the cap may be sized to slip tightly over an exterior of the sleeves.

The piece may be formed from open cell foam. The open cell foam may be a urethane foam having the following chemical formulation:

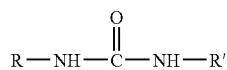

The open cell foam may be polyurethane foam. The piece may be formed from compressed felt.

The tab may be formed from material comprising paper. The tab may be formed from material comprising vinyl.

In a fourth aspect the invention provides a method of cleaning a fitting for use in an air conditioning or refrigeration system or with equipment used in association with an air conditioning or refrigeration system which fitting has a generally cylindrical interior cavity with an open end and a pin extending into the cavity. The method includes inserting into the cavity through the open end a piece of absorbent material with a clearance hole extending into the piece. The piece of resilient material is sized to be inserted into the open end of the interior cavity of the fitting with the clearance hole over the pin and the piece comes into contact with liquid in the cavity. The material is absorbent to liquids ordinarily used in association with air conditioning or refrigeration systems. The absorbent material is non-shedding of its own material and resistant to breakdown when in contact with liquids in ordinary use in an air conditioning or refrigeration system. The method also includes removing the piece from the cavity. The method may include rotating the piece while inserted in the cavity.

In a fifth aspect the invention provides a method of storing a fitting used in an air conditioning or refrigeration system or equipment used in association with an air conditioning or refrigeration system which fitting has a generally cylindrical interior cavity and a pin extending into the cavity. The method includes inserting into the cavity through the open end a piece of resilient material with a clearance hole extending into the piece. The piece of resilient material is sized to be inserted into the open end of the interior cavity of the fitting with the clearance hole over the pin such that the piece is secured in the cavity and the piece comes into contact with liquid in the cavity. The material is absorbent to liquids ordinarily used in association with air conditioning or refrigeration systems. The absorbent material is non-shedding of its own material and resistant to breakdown when in contact with liquids in ordinary use in an air conditioning or refrigeration system.

Other aspects of the invention will be evident from the detailed description hereof.

BRIEF DESCRIPTION OF THE DRAWINGS

For a better understanding of the present invention and to show more clearly how it may be carried into effect, reference will now be made, by way of example, to the accompanying drawings which show the preferred embodiment of the present invention and in which:

FIG. 9 is a perspective view of an absorbent cap in accordance with an alternate preferred embodiment of the present invention;

FIG. 10 is an end view of the cap of FIG. 9 showing an interior of the cap;

FIG. 11 is a perspective view of a cross-section along the line A-A of FIG. 10 of the cap of FIG. 9;

FIG. 12 is a side view of a cross-section along the line A-A of FIG. 10 of the cap of FIG. 9;

FIG. 13 is a perspective view of the cap of FIG. 9 and the fitting of FIG. 4 with the cap and fitting separated from one another;

FIG. 14 is a perspective view of the cap and fitting of FIG. 13 with the cap inserted into the fitting;

FIG. 15 is an end view of the fitting and plug of FIG. 14 looking at the cap;

FIG. 16 is a side view of a cross-section along the line A-A of FIG. 15 of the fitting and cap of FIG. 14;

FIG. 17 is a perspective view of a cross-section along the line A-A of FIG. 15 of the fitting and cap of FIG. 14;

FIG. 18 is a perspective view of an absorbent plug in accordance with an alternate preferred embodiment of the present invention;

FIG. 19 is an alternate perspective view of the plug of FIG. 18;

FIG. 20 is a side view of the plug of FIG. 18; and

FIG. 21 is a rear view of the plug of FIG. 18;

FIG. 22 is a perspective view of an absorbent plug in accordance with a further alternate preferred embodiment of the present invention;

FIG. 23 is an alternate perspective view of the plug of FIG. 18;

FIG. 24 is a side view of the plug of FIG. 18; and

FIG. 25 is a rear view of the plug of FIG. 18.

DETAILED DESCRIPTION OF THE PREFERRED EMBODIMENT

Figure 1:
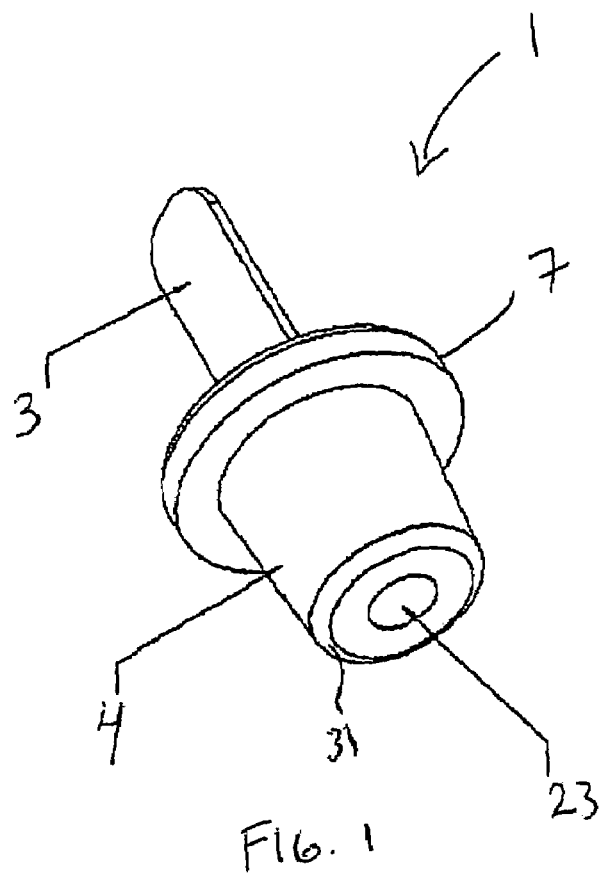
FIG. 1 is a perspective view of an absorbent plug in accordance with a preferred embodiment of the present invention.
Figure 2:
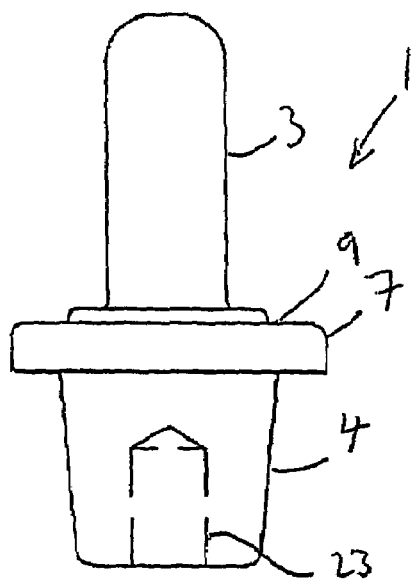
FIG. 2 is a side view of the plug of FIG. 1.
Figure 3:
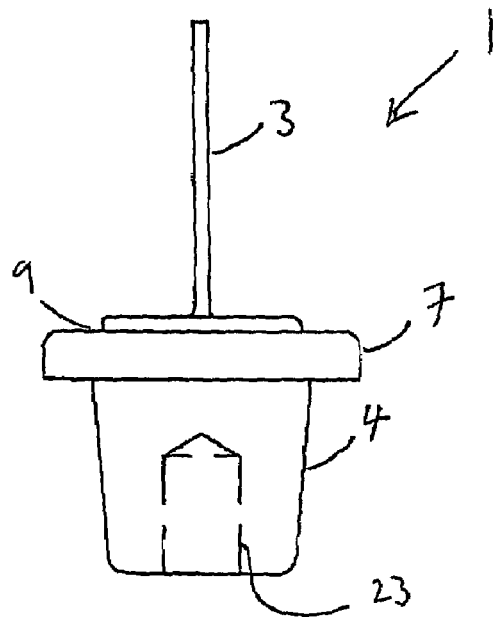
FIG. 3 is a side view of the plug of FIG. 1 rotated 90° from the view of FIG. 2.
Figure 6:
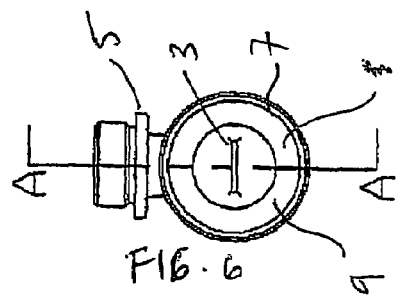
FIG. 6 is an end view of the fitting and plug of FIG. 5 looking at the plug.
Figure 4:
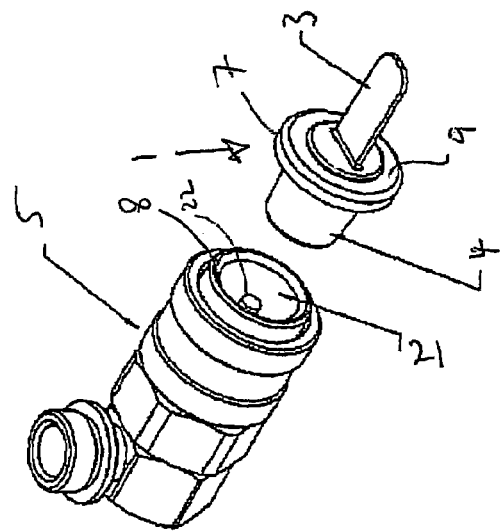
FIG. 4 is a perspective view of the plug of FIG. 1 and an air conditioning or refrigeration fitting with the plug and fitting separated from one another.
Figure 7:
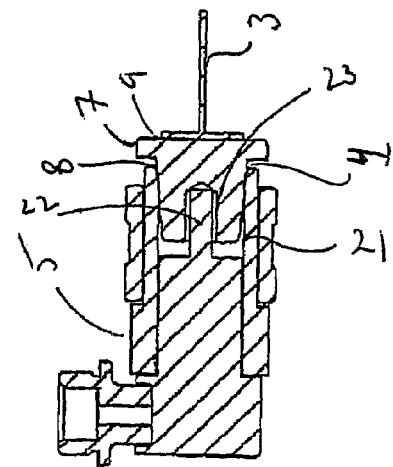
FIG. 7 is a side view of a cross-section of the fitting and plug of FIG. 5 along the line A-A of FIG. 6.
Figure 8:
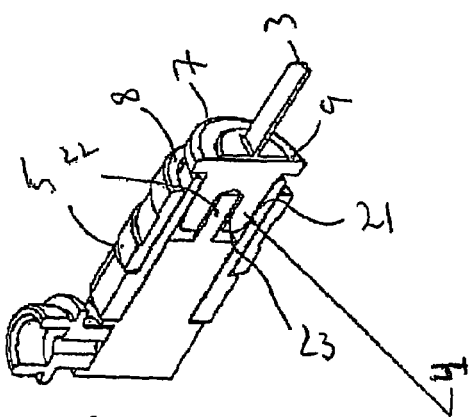
FIG. 8 is a perspective view of a cross-section along the line A-A of FIG. 6 of the fitting and plug of FIG. 5.
Figure 5:
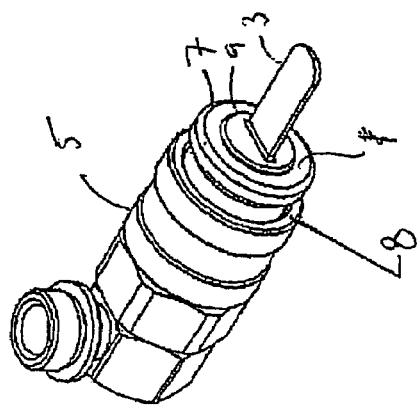
FIG. 5 is a perspective view of the plug and fitting of FIG. 4 with the plug inserted into the fitting.

Referring to FIGS. 1-8, an absorbent plug 1 has a pull tab 3 attached. The plug 1 has a tapered piece 4 of absorbent material that is sized to press lightly into a fitting 5 into which it is placed. The plug 1 is sized and tapered for easy insertion and a secure fit. The piece 4 has a generally frustumconical shape. The fitting 5 may be on an air conditioning or refrigeration system or equipment used in association with air conditioning or refrigeration systems, such as recover and recycling machines, vacuum pumps, charging stations, injectors, and the like. The fitting 5 has an open end 6. An extended ridge 7 around an end 9 provides more absorption volume. The extended ridge 7 also extends over a rim 8 of the fitting 5.

There are many ways to secure the piece 4 in the fitting 5. Examples such as a friction fit from a compressible resilient material, corresponding threads, and a ball and groove mechanism will be described herein. Other examples will be evident to those skilled in the art using the description provided herein. The friction fit of a compressible resilient material has been found to be preferable.

The piece 4 can also be inserted in many ways. For example with a friction fit or ball and groove arrangement longitudinal pressure can simply be exerted to press the piece 4 into the fitting 5. If threads are used then rotation may be required.

The pull tab 3 is a non absorbent material and provides a clean tab for the user to pull to remove the plug 1 and throw it away without getting dye on his or her fingers. The pull tab 3 may be formed from paper, vinyl, string or another material that is sufficiently strong to pull the plug 1 from the fitting 5 without breaking. The pull tab 3 is attached to the extended ridge 7 using an adhesive or the like. As a further alternative the pull tab 3 may be replaced by a longer extended ridge 7 or other absorbent material extension that can be grasped in order to remove the piece 4 from cavity 21. The extension could be coated in order to reduce the possibility of a user coming into contact with liquid from the piece 4; however, the extension can be made long and hard enough that liquid will not come into contact with a user in most ordinary circumstances.

Referring to FIGS. 9-17, an absorbent cap 11 is shown. An exterior of the cap 11 is a protective non absorbent skin 13 to protect the user's fingers from the dye as the cap 11 is pressed onto the fitting 5. An interior 14 of the cap 11 is made of an absorbent material. The interior 14 is sized to slip tightly onto an exterior 16 of a fitting 5 for which it is intended so that the cap 11 is secured to the fitting 5. The skin 13 can assist in keeping the absorbent material of the interior 14 against the exterior 16 of the fitting 5. The interior 14 also has an extension 19 which extends, into an interior cavity 21 of a fitting 5 to absorb dye from the interior cavity 21. The cap 11 can be sized to fit a variety of fittings 5. Some fittings 5, such as the snap-on R-134A coupler 5 shown in the FIGS., have a valve pin 22 that extends into the cavity 21. The plug 1 and the extension 19 each have a clearance hole 23 that extends partway toward end 9. The clearance hole 23 is sized to allow for clearance of the pin 22 while substantially filling the cavity 21 as the plug 1 or extension 19 is inserted. The cap 11 may be pulled from the fitting 5 by simply squeezing the skin 13 between two or fingers and pulling the cap 11.

Referring in particular to FIGS. 4-8, the fitting 5 shown in the FIGS. is an R-134A snap on coupler 5. The absorbent plug 1 engages fitting 5. The plug 1 extends into the fitting 5 interior cavity 21 to absorb residual dye in the cavity 21. The plug 1 will have a variety of shapes to fit a variety of fittings 5. The plug 1 is tapered and made of a conforming material. Accordingly, when the plug 1 is pushed into the interior cavity 21 the plug 1 stays in place.

Referring in particular to FIGS. 13-17, the absorbent cap 11 engages fitting 5. The cap 11 conforms to the exterior of the fitting 5. Some fittings 5, such as the snap-on R-134A coupler 5 shown in the FIGS., have additional locations outside the interior cavity 21 that may hold dye, whether intentionally or not. One such location 25 is from between sleeves 27, 29 possibly through retaining ball holes, not shown. By conforming to the exterior 16 of the fitting 5, the cap 11 can absorb dye from such locations 25, including absorbing residual dye coming from between the sleeves 27, 29 possibly out of the retaining ball holes. The inner extension 19 fills up the interior cavity 21 and absorbs residual dye in the interior cavity 21.

The absorbent plug 1 or cap 11 will absorb dye out of the fitting 5 when placed into or onto the fitting 5. This plug 1 or cap 11 will not merely contain the dye, but rather absorb the dye, preferably leaving the interior and exterior of the fitting 5 clean with no remaining dye to leak out or contaminate the next fitting, not shown, to which it is connected, for example an air conditioning or refrigeration system port. When removed from the fitting 5, the absorbent plug 1 or cap 11 will be discarded. A new absorbent plug 1 or cap 11 is placed in the fitting 5 after each use, thereby keeping the fitting 5 clean use after use and limiting the possibility of contamination of surroundings and future fittings to which the fitting 5 is connecting, including for example system ports. This absorbent plug 1 or cap 11 addresses the mess associated with dye injectors, and air conditioning and refrigeration fittings 5, currently in use. As is known in the industry, injectors or injector cartridges are typically connected to a fitting 5 through a hose, not shown. By absorbing the dye to be discarded, this invention protects the area where the dye injector is stored. It also prevents the exterior of system ports from becoming contaminated.

The piece 4 has a bevel 31 that assisting in centering the piece 4 during insertion into the cavity 21.

The plug 1 or cap 11 provides sufficient absorbing material in contact with the fitting 5 adjacent the rim 8 to limit the possibility of liquid escaping from the cavity 21. It is not necessary that the plug 1 or cap 11 fill the entirety of the cavity 21. It is however preferable that the plug 1 or cap 11 fill as much of the cavity 21 as practical to absorb as much liquid from the cavity 21 as possible. As the orientation of a mobile fitting 5, such as fitting 5 attached to an injector, may be changed often there is a good chance that liquid in the cavity 21 will come into contact with the absorbent material even if it does not fill the cavity; however, this is not guaranteed.

It should also be recognized that the plug 1 and cap 11 can be used to clean fitting 5 by simply inserting the plug 1 or cap 11 into the fitting 5 and removing the plug 1 or cap 11. Rotating the plug 1 or cap 1 in the cavity 21 may assist in the cleaning process. For this purpose the more of the cavity 21 that can be filled, the better the cleaning process. The extended ridge 7 can be used to clean the rim 8 of fitting 5. The plug 1 and cap 11 also protect the fitting 5 from entry of undesired substances such as dirt.

The absorbent material is absorbent, non-shedding of its own material (such as fibres or the like that could be introduced to an air conditioning or refrigeration system), can be inserted into the cavity 21, and is resistant to break down when in use with liquids ordinarily encountered in an air conditioning or refrigeration environment. Such liquids may contain refrigerant, lubricant, fluorescent dye, performance additives (such as antacids), sealants and the like. It should be taken into account that the plug 1 and cap 11 may be in contact with one or more of these materials for a considerable period of time, for example during storage of the system or equipment with which it is used.

The absorbent material should be absorbent to dyes and oils commonly used in air conditioning and refrigeration systems as these are the liquids that will be commonly encountered.

The absorbent material could be compressible or hard. In the preferred embodiment the absorbent material is compressible. Where the absorbent material for the piece 4 is compressible, it can be made slightly larger than the opening for the fitting 5. The absorbent material deforms slightly as it is pressed in to the fitting 5. In this case the absorbent material should be sufficiently resilient to allow it to return to its original shape in the cavity 21 (subject to containment by the cavity 21 itself). This compressible resilient material is preferred as it can fill in the entire cavity 21 as it returns to its original shape. This prevents dye from exiting the cavity 21 about the edge of the piece 4 before it is absorbed. Examples of such a compressible resilient material include compressed felt and many commercial foams, such as polystyrene or polyurethane foams.

If the material is very compressible then the clearance hole may be unnecessary. The pin simply pushes into the material. Unless the foam is tearable to receive the pin then this may tend to hold the piece 4 off the bottom of the cavity 21. However, if the fitting 5 is on its side or opening downward then the liquid will run up toward the piece 4 and be absorbed.

Open cell foams are generally better adapted to this application as they tend to be more absorbent. The material used for the piece 4 in the preferred embodiment wicks dye and oil from the cavity 21 to leave the cavity 21 clean when the piece 4 is removed without no dripping in normal use.

Compressible resilient absorbent material can also be very forgiving. For example, if the cavity 21 has threads on the inside (for example, if the fitting 5 is used in association with a R12 fitting, not shown), then the material can be rotated into the threads or simply pushed past the threads without rotation. If there are retaining balls, not shown, in the cavity 21 then the material simply compresses around the balls and expands back out to embed the balls in the material. This assists in retaining the material in place.

The material for the piece 4 in the preferred embodiment was a nominal PCF (pounds per cubic foot) urethane foam having the following chemical formulation:

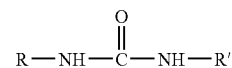

The detailed specifications of the foam are shown in Table 1. The tests performed to obtain the specifications in Table 1 were performed in accordance with ASTM D-3574-01.

TABLE 1

| Characteristic | Unit of Measurement | Specification |
| --- | --- | --- |
| Density | Lbs. per cubic foot | 0.90-1.00 |
| I.F.D. | Lbs. force per 50 sq. inch | 27-35 |
| Modulus | Ratio of 65%/25%/ILD | 1.95 min |
| Tensile strength | Lbs. per square inch | 13 min |
| Tear resistance | Lbs. per inch thickness | 1.8 min |
| Elongation | Percent | 175 min |
| Compression set | Percent loss | 8 max |
| Resilience |  | 40 min |

The piece 4 and extended ridge 7 and the cap 11 and extension 19 may be made from different absorbent materials if desired. For example, the piece 4 may be made from a more deformable material than the extended ridge 7 if desired for easier insertion into the cavity 21.

In the preferred embodiment the extended ridge is made from a nominal 2 Lb. cross-linked polyethylene have the detailed specifications listed in Table 2.

TABLE 2

| 1.93 | Density | GB 6343 | PCF |
|---|---|---|---|
| 34.8 | Tensile Strength | GB 6344 | PSI |
| 150 | Elongation | GB 6344 | % |
| 2.7 | Tear Strength | GB 10808 | PLI |
| 8.4 | Compression Strength (25%) | GB 8813 | PSI |
| 0.006 | Water Absorption | GB 4303 | Lb/Ft$^2$ |
| 16-20 | C-type Durometer Hardness | | |

The foams specified in Tables 1 and 2 can be obtained from Kristofoam Industries Inc. of CONCORD, Ontario.

Referring to FIGS. 18-21, although the preferred embodiments describes in FIGS. 1-17 have been shown with a taper, a taper is not required in all embodiments. For example, an absorbent plug 51 could be used. Plug 51 has a pull tab 53 and extended ridge 57 around an end 59 that are similar to the pull tab 3 and extended ridge 7; however, the plug 51 has a generally cylindrical piece 61. The piece 61 also has a clearance hole 63. The absorbent material used in the preferred embodiment of plug 51 is easily deformable on insertion into the cavity 21 while being sufficiently resilient to return to its original shape in the cavity 21 (subject to containment by the cavity 21).

The piece 61 can be extruded, cut and mated to the extended ridge 57. The clearance hole 63 is also generally cylindrical and can extend through the piece 61. The piece 61 and extended ridge 57 can be mated using an adhesive or possibly by heat welding. Extrusion can have a significant cost saving over moulding the piece 61 or manufacturing it through other methods.

The piece 61 could also be used in place of the extension 19 of cap 11.

In operation the plug 51 is used in the same manner as the plug 1.

Referring to FIGS. 22 to 25, a plug 81 has a piece 91 that is formed from a hard absorbent material. The plug 81 also has an extended ridge 93, clearance hole 94 and pull tab 95 similar to the extended ridge 7 and the pull tab 3.

The piece 91 is also generally cylindrical; however, it has a diameter that is slightly smaller than the diameter of the cavity 21. This allows the piece 91 to be inserted into the cavity 21. Either the piece 91 will be deformed by the balls or the balls will be pushed outwardly by the piece 91. The force of the balls will tend to hold the piece 91 in the cavity 21. Preferably, the piece 91 has a circumferential groove 97 to receive the balls and hold the piece 91 in place. As a further alternative, the price 91 could have a circumferential thread, not shown, to match any threads on the interior of the cavity 21. This would also hold the piece 91 in place. A hard material is generally not preferred as it is easier for some liquid to leak past, or be forced past, the piece 91 without being absorbed.

Alternate embodiments could be placed into or over other fittings, not shown, such as a system port after dye injection to absorb the dye that remains in the system port, thereby cleaning this port and limiting the possibility of contamination of the area around the system port. This absorbent device could be placed under existing rigid system port caps or replace the existing system port caps by a rigid port cap with absorbent material inside this rigid cap. These caps could be used on many fittings, including ports on not just air conditioning and refrigeration systems, but on all associated equipment used to service such systems.

It will be understood by those skilled in the art that this description is made with reference to the preferred embodiment and that it is possible to make other embodiments employing the principles of the invention which fall within its spirit and scope as defined by the following claims.

We claim:

1. A plug and fitting combination comprising:
   a fitting for use with an air conditioning or refrigeration system or with equipment used in association with an air conditioning or refrigeration system which fitting has a generally cylindrical interior cavity open at one end, and a plug including a piece of resilient material that is sized to be inserted into the open end of the interior cavity of the fitting such that the piece is secured in the cavity and the piece comes into contact with liquid in the cavity, wherein the absorbent material is absorbent to liquids ordinarily used in association with air conditioning or refrigeration systems, wherein the absorbent material is non-shedding of its own material and is resistant to breakdown when in contact with liquids in ordinary use in an air conditioning or refrigeration system, and wherein the absorbent material contacts an interior surface of the interior cavity of the fitting when the plug is inserted into the fitting.

2. The combination of claim 1 further comprising: a cap with an interior absorbent material and an exterior skin of nonabsorbent material, wherein the interior of the cap is sized to slip securely onto an exterior of the fitting to absorb liquid that may be located on the fitting outside the interior cavity, and wherein the piece extends from the cap into the interior cavity.

3. The combination of claim 2 wherein the fitting is a snap-on coupler with coaxial sleeves, and wherein the interior of the cap is sized to slip tightly over an exterior of the sleeves.

4. A plug and fitting combination comprising:
   a fitting for use with an air conditioning or refrigeration system or with equipment used in association with an air conditioning or refrigeration system which fitting has a generally cylindrical interior cavity open at one end and a pin extending into the cavity from an opposing end, and a plug including a piece of resilient material with a clearance hole extending into the piece, wherein the piece of resilient material is sized to be inserted into the open end of the interior cavity of the fitting with the clearance hole over the pin such that the piece is secured in the cavity and the piece comes into contact with liquid in the cavity, wherein the absorbent material is absorbent to liquids ordinarily used in association with air conditioning or refrigeration systems, wherein the absorbent material is non-shedding of its own material and is resistant to breakdown when in contact with liquids in ordinary use in an air conditioning or refrigeration system, and wherein the absorbent material contacts an interior surface of the interior cavity of the fitting when the plug is inserted into the fitting.

5. The combination of claim 4 wherein the piece is generally cylindrical with the clearance hole running axially within the piece, and wherein the piece substantially fills the internal diameter of the cavity to limit the possibility of liquid leaking from the cavity before it is absorbed.

6. The combination of claim 4 wherein the piece is generally frustumconical with the clearance hole running axially within the piece from an end of narrower diameter.

7. The combination of claim 5 wherein the piece substantially fills the cavity.

8. The combination of claim 5,wherein the piece has an external diameter slightly larger than the internal diameter of the cavity and the material is sufficiently compressible to allow the piece to be inserted into the cavity, while sufficiently resilient to return to its original form subject to containment by the cavity.

9. The combination of claim 8 wherein the piece can be secured by contact with an internal surface of the cavity.

10. The combination of claim 5 wherein the fitting has an internal thread about the inner circumference of the cavity and the piece can be inserted and secured by rotating it on to the threads.

11. The combination of claim 10 wherein the piece is formed from a hard material and wherein the piece has a circumferential thread to match the thread on the interior of the cavity such that the piece may be inserted and secured by engaging the respective threads and rotating the piece.

12. The combination of claim 5 wherein the piece can be secured by contact with an internal surface of the cavity.

13. The combination of claim 5 wherein the fitting has at least one spring loaded ball projecting into the cavity from the inner circumference of the cavity, and wherein the piece can be inserted past the at least one ball under longitudinal pressure.

14. The combination of claim 5 wherein the fitting has at least one spring loaded ball projecting into the cavity from the inner circumference of the cavity, wherein the piece has a circumferential ball groove into the piece, and wherein the piece is sufficiently hard that it can be inserted into the cavity under longitudinal pressure, pushing away the at least one ball during insertion, and wherein the groove engages the at least one ball to secure the piece.

15. The combination of claim 5 wherein the piece further comprises an extended ridge around an end of the piece opposite the clearance hole to provide additional absorption volume outside the interior cavity of the fitting and to contact a rim of the fitting to absorb liquid from the rim.

16. The combination of claim 5 further comprising a non-absorbent pull tab at an end of the absorbent piece opposite the clearance hole.

17. The combination of claim 16 wherein the piece further comprises an extended ridge around the end of the piece opposite the clearance hole to provide additional absorption volume outside the interior cavity of the fitting, wherein the extended ridge lies between the clearance hole and the pull tab.

18. The combination of claim 16 wherein the tab is formed from material comprising paper.

19. The combination of claim 16 wherein the tab is formed from material comprising vinyl.

20. The combination of claim 5 wherein the piece is formed from open cell foam.

21. The combination of claim 20 wherein the open cell foam is a urethane foam having the following chemical formulation:

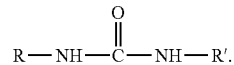

22. The combination of claim 20 wherein the open cell foam is polyurethane foam.

23. The combination of claim 5 wherein the piece is formed from compressed felt.

24. A cap and fitting combination comprising: a fitting for use in an air conditioning or refrigeration system or with equipment used in association with an air conditioning or refrigeration system which fitting has a generally cylindrical interior cavity open at one end, and a cap including an absorbent material portion and an exterior skin of non absorbent material, wherein the the cap is sized to slip securely onto an exterior of the fitting, wherein the absorbent material is absorbent to liquids ordinarily used in association with air conditioning or refrigeration systems, wherein the absorbent material is non-shedding of its own material and is resistant to breakdown when in contact with liquids in ordinary use in an air conditioning or refrigeration system, and wherein the absorbent material contacts an interior surface of the interior cavity of the fitting when the cap is slipped onto the fitting.

25. The combination of claim 24 wherein the fitting is a snap-on coupler with coaxial sleeves, and wherein the interior of the cap is sized to slip tightly over an exterior of the sleeves.

* * * * *